June 12, 1951 C. W. PAULSEN 2,557,007
PIPE FLOW RECORDING DEVICE
Filed Sept. 25, 1945 2 Sheets-Sheet 1

INVENTOR.
C. W. Paulsen
BY
ATTYS

June 12, 1951   C. W. PAULSEN   2,557,007
PIPE FLOW RECORDING DEVICE

Filed Sept. 25, 1945   2 Sheets-Sheet 2

INVENTOR.
C. W. Paulsen
BY
ATTYS

Patented June 12, 1951

2,557,007

UNITED STATES PATENT OFFICE 2,557,007

PIPE FLOW RECORDING DEVICE

Clarence W. Paulsen, Taft, Calif.

Application September 25, 1945, Serial No. 618,450

1 Claim. (Cl. 346—36)

This invention is directed to, and it is an object to provide, a novel mechanism designed to automatically record or chart the flow of a fluid through a conduit, especially where the flow pulsates as in the outlet pipe of an oil well pump. While especially designed for use with oil well pumps, the invention obviously may be put to many other uses.

Another object of the invention is to provide a flow recording device, of the type described, which comprises a flow operated flap valve unit adapted to be interposed in a pipe, and an enclosed type, rockably actuated flow recording unit having therein a clock driven chart and a pendulum actuated stylus arranged to scribe the chart; the recording unit being mounted for rocking movement adjacent and responsive to the valve.

A further object of the invention is to provide a flow recording device which is practical and accurate in operation; the resulting chart evidencing whether or not the pump is operating efficiently, and the periods of time the pump may have been out of operation. Thus, if the engine stops, or any of the pump parts break, or the pump functions improperly and lessens in pumping volume for any reason, these facts reflect on the chart automatically produced by the recording device.

A further object of the invention is to produce a simple and inexpensive device, and yet one which will be exceedingly effective for the purpose for which it is designed.

These objects are accomplished by means of such structure and relative arrangement of parts as will fully appear by a perusal of the following specification and claim.

In the drawings similar characters of reference indicate corresponding parts in the several views.

Referring now more particularly to the characters of reference on the drawings, the device comprises a flap valve unit, indicated generally at 1, and which is here shown as arranged for use in connection with an oil well pump, indicated generally at 2. The flap valve unit 1 includes a fitting 3 interposed in the outlet pipe 4 of the pump 2.

Figure 1:
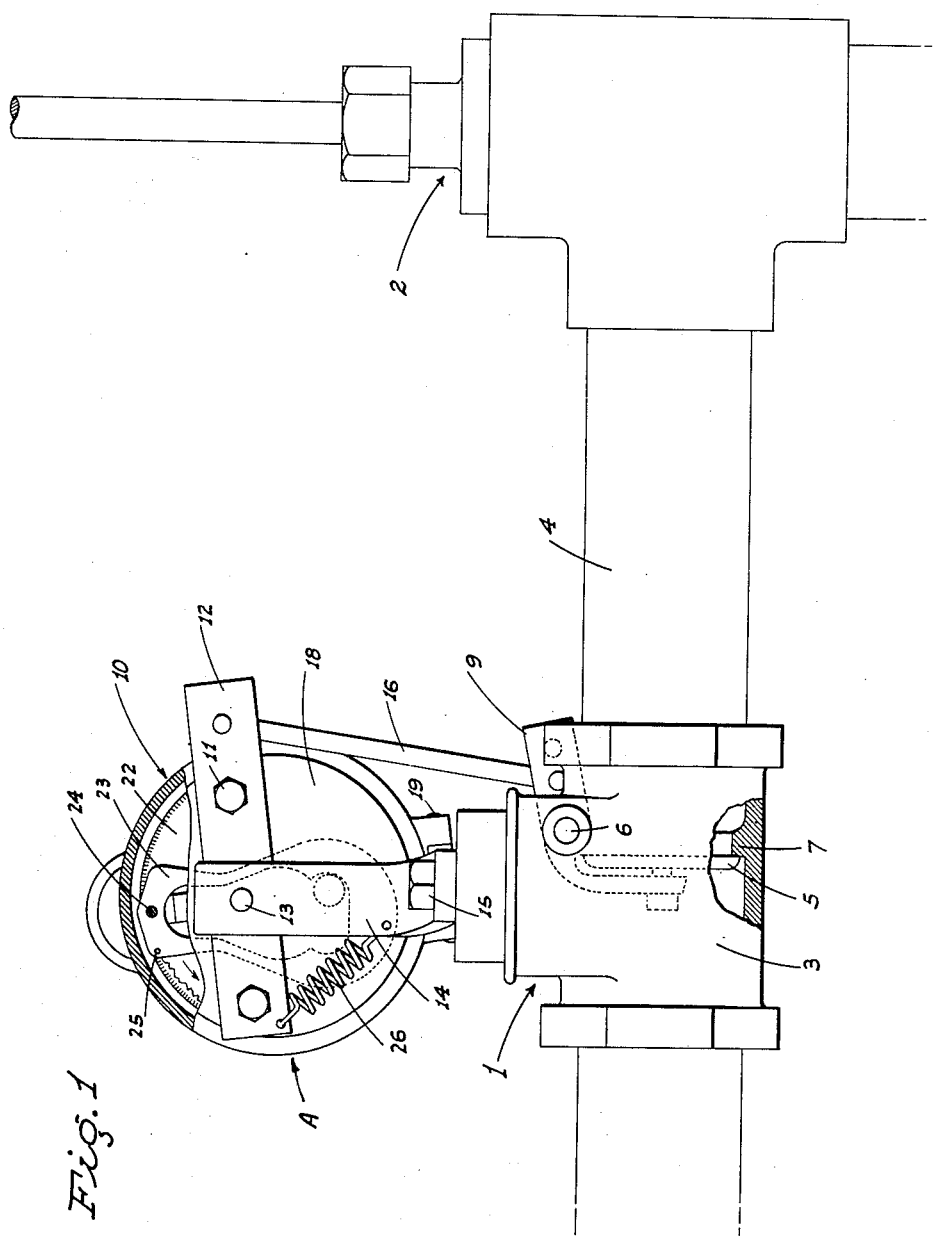
Figure 1 is a side elevation of the device as interposed in the outlet pipe of an oil well pump and with the flap valve closed; the device being partly broken away, and partly in section.
Figure 2:
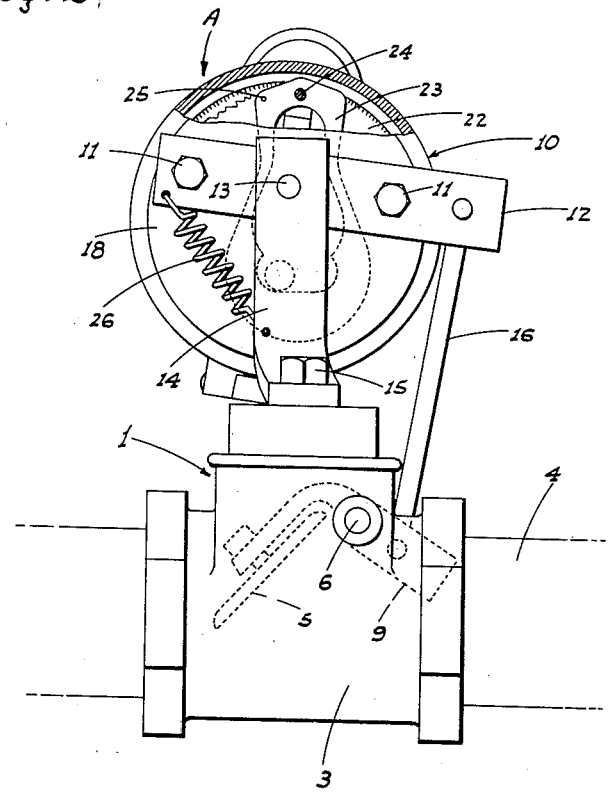
Figure 2 is a similar view of the device, but with the flap valve open, whereby to cause a rocking motion of the recording unit.
Figure 3:
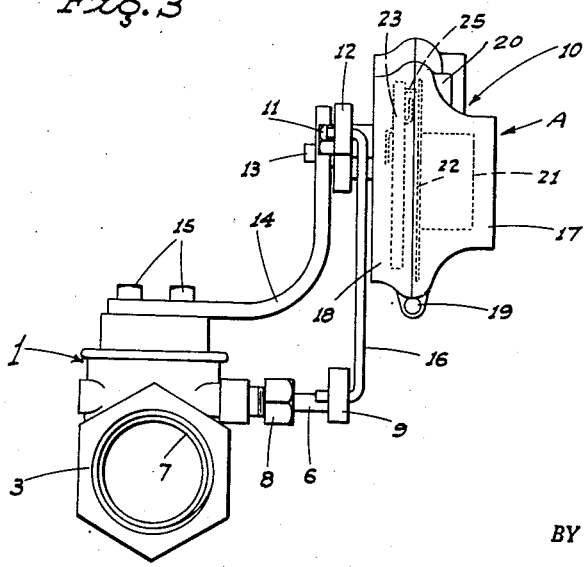
Figure 3 is an end view of the flap valve unit showing the flow recording unit as mounted in connection therewith.

A flap valve 5 is swingably mounted within the fitting 3 by means of a cross shaft 6; the flap valve 5 closing toward the pump 2 and, when closed, abutting against an annular stop seat or shoulder 7 within said fitting 3. With each surge of oil through the outlet pipe 4 in a direction away from the pump 2, the flap valve 5 is swung, relatively forcefully, from the closed position as shown in Fig. 1 to the open position as shown in Fig. 2.

The cross shaft 6 extends laterally out of the fitting 3 through a bushing 8, and at its outer end said cross shaft is fitted with a radial arm 9.

A wholly enclosed, rockably actuated recording unit, indicated generally at 10, is disposed laterally of the fitting 3 in the same direction as the projection of the cross shaft 6, and some distance above the latter; said recording unit including a housing, indicated generally at A, affixed, at the back, to a rocking lever 12 which extends parallel to the radial arm 9. The rocking lever 12 is pivotally secured, as at 13, to one leg of an L-shaped bracket 14 fixed on the top of the fitting 3, by bolts 15, with said one leg thereof extending in an upward direction. The axis of the pivot 13 is parallel to the cross shaft 6, and the recording unit housing A is rocked about the pivot 13 upon up and down swinging movement of the rocking lever 12 when mounted as described.

A link 16 pivotally connects between the radial arm 9 and an end portion of the rocking lever 12 so that when the flap valve swings back and forth between closed and open positions, a corresponding rocking movement is imparted to the lever 12 and housing A.

The recording unit housing A comprising a front half 17 and a rear half 18 hinged together at the bottom, for opening movement of said front half, by means of a hinge, indicated at 19. The halves 17 and 18 of the housing are normally locked together by a key-type lock 20, and the housing remains closed during operation of the device. The housing is only opened to inspect or replace the chart.

A clock unit 21 is mounted in the front half 17 of the housing and drives a circular, replaceable time chart 22 which faces in the direction of the rear half 18 of the housing.

The rear half 18 of the housing of the recording unit 10 is fitted with a pendulum 23 suspended from a pivot 24, and to one side of said pivot the pendulum includes a stylus 25 projecting toward and scribing on the adjacent face of the circular time chart 22. These parts are wholly enclosed in housing A, and the pendulum stylus functions to scribe the chart, in the manner hereinafter described, solely by reason of rocking of the housing A about the axis of pivot 13; the lever 12 and link 16 having no direct connection with the pendulum stylus.

In operation the pump 2 successively and intermittently produces a surge of oil in the outlet pipe 4. The flap valve 5 is normally maintained in closed position by a tension spring 26 connected between the end of lever 12 opposite the link 16 and the upstanding leg of the bracket 14. However, with each surge of oil at the outlet pipe 4 the valve swings open, and when the surge has passed said valve is immediately closed by the spring 26. Each such surge in the outlet pipe 4 thus causes one swinging cycle of the rocking lever 12 and recording unit housing A. When this occurs the stylus 25, upon rocking of the recording unit housing A relative to the normally stationary pendulum 23, causes the stylus 25 to inscribe a graph line on the face of the circular time chart 22. The graph line as thus scribed evidences clearly the timing of the pump and the length of each oil surge through the pipe 4. It is therefore possible to determine from the graph whether or not the pump is operating efficiently and properly. Additionally, should the pump cease functioning for any reason, the length of time that the pump is out of operation will reflect clearly on the graph line.

The circular time charts 22 are of course removable, and after each chart has run its course it is removed and a new one substituted. The removed charts can be maintained for future records, which are often valuable: for example, retained charts will evidence a well's decline in production and indicate the most profitable time to recondition the same.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

A flow recording device comprising a movable valve adapted to be interposed in a pipe, a housing, a driven chart-disc pivoted in the housing, a pendulum pivoted in the housing above the disc pivot, a disc engaging stylus mounted on the pendulum in laterally offset relation to the pivot thereof, means pivoting the housing for rocking movement about an axis eccentric to that of the disc and means connecting the housing to the valve to rock the housing about its pivot upon movement of the valve.

CLARENCE W. PAULSEN.

REFERENCES CITED

The following references are of record in the file of this patent:

UNITED STATES PATENTS

| Number | Name | Date |
|---|---|---|
| 299,737 | Chapin | June 3, 1884 |
| 963,055 | Miller | July 5, 1910 |
| 1,063,255 | Hanks | June 3, 1913 |
| 1,181,037 | Rickert et al. | Apr. 25, 1916 |
| 1,907,167 | Williams | May 2, 1933 |
| 2,078,888 | Zimmer | Apr. 27, 1937 |
| 2,152,671 | Smith | Apr. 4, 1939 |